United States Patent [19]

Mitsuhashi

[11] Patent Number: 4,700,255

[45] Date of Patent: Oct. 13, 1987

[54] MAGNETIC TAPE RECORDING APPARATUS

[75] Inventor: Yasuo Mitsuhashi, Nagaokakyo, Japan

[73] Assignee: Mitsubishi Denki Kabushiki Kaisha, Tokyo, Japan

[21] Appl. No.: 833,605

[22] Filed: Feb. 27, 1986

[30] Foreign Application Priority Data

Mar. 7, 1985 [JP] Japan .................................. 60-46078

[51] Int. Cl.[4] .............................................. B11B 5/008

[52] U.S. Cl. ....................................... 360/74.1; 360/5; 360/71

[58] Field of Search ............................. 360/71, 74.1, 5

[56] References Cited

U.S. PATENT DOCUMENTS 4,554,604 11/1985 Koyama ............................... 360/95

4,607,297 8/1986 Sonoda et al. ........................ 360/55

*Primary Examiner*—George G. Stellar

*Attorney, Agent, or Firm*—Lowe Price Leblanc Becker & Shur

[57] ABSTRACT

When a standby command is issued in a long-period recording (intermittent recording) mode, a control circuit 70 stops the rotation of a rotating drum 60 and a capstan shaft 72 with a magnetic tape 20 being maintained in a loaded state. Then, a back tension arm 310 is moved and rotating torques are applied to a feed reel 11 and a take-up reel 12 in opposite directions, whereby a prescribed back tension is applied to the magnetic tape 20.

5 Claims, 7 Drawing Figures

START
LOADING S1
RECORDING S2
STANDBY COMMAND S3 NO YES
REWIND A FIXED AMOUNT S4
STOP THE ROTATING DRUM S5
DETACH THE PINCH ROLLER FROM THE CAPSTAN SHAFT S6
STOP THE CAPSTAN SHAFT S7
ROTATE THE SUPPLY REEL AND THE TAKE UP REEL IN OPPOSITE DIRECTIONS S8
MOVE THE BACK TENSION ARM TOWARD B S9
STANDBY CANCEL COMMAND S10 NO YES
CONTACT THE PINCH ROLLER WITH THE CAPSTAN SHAFT S11
LOWER THE REVERSE ROTATING TORQUE OF THE SUPPLY REEL S12
MOVE THE BACK TENSION ARM TOWARD C S13
ROTATE THE ROTATING DRUM S14
ROTATE THE CAPSTAN SHAFT S15
CONTROL SIGNAL IS INTERRUPTED ? S16 NO YES
RECORDING S17
STANDBY COMMAND S18 NO YES 51
32
60
33
52
41
42
43
31
71
72
20
12
11
10

51
32
60
33
52
41
42
43
31
71
31
32
72
20
33
12
11
10

MAGNETIC TAPE RECORDING APPARATUS

BACKGROUND OF THE INVENTION

1. Field of the invention

The present invention relates to a magnetic tape recording apparatus (hereinafter referred to as VTR) and particularly to a VTR in which only the necessary amount can be recorded intermittently as required and recording can be made for 24 hours or more by using one cassette.

2. Description of the Prior Art

FIG. 1 is a perspective view showing a tape running mechanism of a conventional VTR of a helical scanning system and FIGS. 2 and 3 are plan views thereof. FIG. 4 is an illustration showing an example of a magnetic tape pattern recorded by a conventional VTR.

First, referring to FIGS. 1 through 4, a conventional VTR of a helical scanning system will be briefly described. A magnetic tape 20 wound on a supply reel 11 of a cassette 10 is drawn out from the cassette 10 by means of guide rollers 31 and 32 on the ingoing side and a guide roller 33 on the outgoing side. Then, the magnetic tape 20 is brought into contact with a total width erasing head 41 and an impedance roller 51 and after that it is wound on a rotating drum 60. Further, the magnetic tape 20 is brought into contact with an impedance roller 52, a sound erasing head 42 and a sound control head 43, and then it is held between a capstan shaft 72 and a pinch roller 71. Thus, the magnetic tape 20 is held under pressure between the capstan shaft 72 and the pinch roller 71 and when the capstan shaft 72 rotates, the magnetic tape 20 can be made to run for recording or reproduction so as to be wound on a take-up reel 12 in the cassette 10.

The above stated rotating drum 60 comprises an upper rotating drum 61 and a lower fixed drum 62 as a pair and by means of a video head 63 contained in the upper rotating drum 61, a video signal is recorded on video tracks 21 and 22 of channels 1 and 2 of the magnetic tape 20 as shown in FIG. 5. In addition, a sound signal is recorded on audio tracks 23 and 24 of the channels 1 and 2 of the magnetic tape 20 by means of a sound recording portion of the sound control head 43. The total width erasing head 41 erases all the signals recorded till then in the magnetic tape 20, that is, the video signal, the sound signal, the control signal and the like and the sound erasing head 42 serves for so-called after recording.

Thus, the magnetic tape 20 drawn out from the cassette 10 is correctly brought into contact with the respective heads whereby the respective signals can be correctly recorded in or reproduced from the magnetic tape 20 as shown in FIG. 4.

In such a conventional VTR as described above, the above described operation involves no problem if recording is made continuously. However, continuous recording by such a conventional VTR can be made only for several hours by using one cassette.

On the other hand, a monitoring VTR is widely utilized in a bank, a store etc. Generally, such a VTR for monitoring needs only to make recording in a period when an event occurs, for example, in a period when a human enters a store. Accordingly, for the purpose of making recording for a long period, such a conventional monitoring VTR is brought into a pause state when recording is not required. More specifically, the conventional VTR is brought into the state shown in FIG. 3 in which the magnetic tape 20 is made to stop running by stopping only the rotation of the capstan shaft 72. In this case, however, the rotating drum 60 still rotates in this pause period by 1800 rpm for example and if this state is continued for a long period, it is feared that the video head 63 might be worn out or the magnetic tape 20 might be damaged by the video head 63 if a large tension is applied to the magnetic tape 20. For this reason, a pause state or a reproduced still state is always made to be automatically cancelled after several minutes.

In addition, in order to dissolve the above described drawbacks, a method might be used in which the loaded state of the tape as shown in FIG. 2 (an enabled state for recording) is cancelled and the VTR is made on standby in an unloaded state as shown in FIG. 3 and is brought into the loaded state when an event occurs. In this method, however, the guide rollers 31 and 32 on the ingoing side and the guide roller 33 on the outgoing side are moved each time from the state shown in FIG. 2 to the state shown in FIG. 3, in other words, they are moved for loading the tape as shown in the figure by the arrows, which causes wearing out of the loading mechanism for driving the above described guide rollers 31, 32 and 33. Furthermore, a large driving force is generally required for the loading mechanism and accordingly a noise occurs in loading, which is not desirable considering the purpose of monitoring. Moreover, since loading of the tape is started after an event occurs, a lapse of several seconds is unavoidably required as the time for loading the tape and as a result responsitivity for monitoring is not good.

SUMMARY OF THE INVENTION

It is an object of the present invention to provide a VTR, utilizable for monitoring, in which intermittent recording can be made for a long period as is different from a conventional VTR and the format recorded on a magnetic tape is interchangeable with the format continuously recorded by a conventional VTR, said VTR of the present invention making it possible to make intermittent recording for several days by one cassette.

Briefly described, when a VTR of the present invention makes intermittent recording, the rotation of a rotating drum and a capstan shaft is stopped with a magnetic tape being maintained in a loaded state and a prescribed back tension is applied to the magnetic tape so that the VTR is brought into a standby state.

In the first aspect of the present invention, a back tension is applied to a magnetic tape by means of a back tension arm.

In the second aspect of the present invention, a back tension is applied to a magnetic tape by applying opposite rotating torques to a supply reel and a take-up reel.

In the third aspect of the present invention, a back tension is applied to a magnetic tape by applying opposite rotating torques to a supply reel and a take-up reel as well as by using a back tension arm.

According to the present invention, a magnetic tape and a magnetic head will never be worn out in a standby state and accordingly the magnetic tape and the magnetic head can be assured of a long lifetime. In addition, since a magnetic tape is always in a loaded state, good responsitivity is assured for starting the succeeding recording and wearing out of the loading mechanism can be decreased. Furthermore, since a prescribed back tension is applied to a magnetic tape in a standby state, the magnetic tape in a standby state can be prevented from deviating with respect to the magnetic head.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
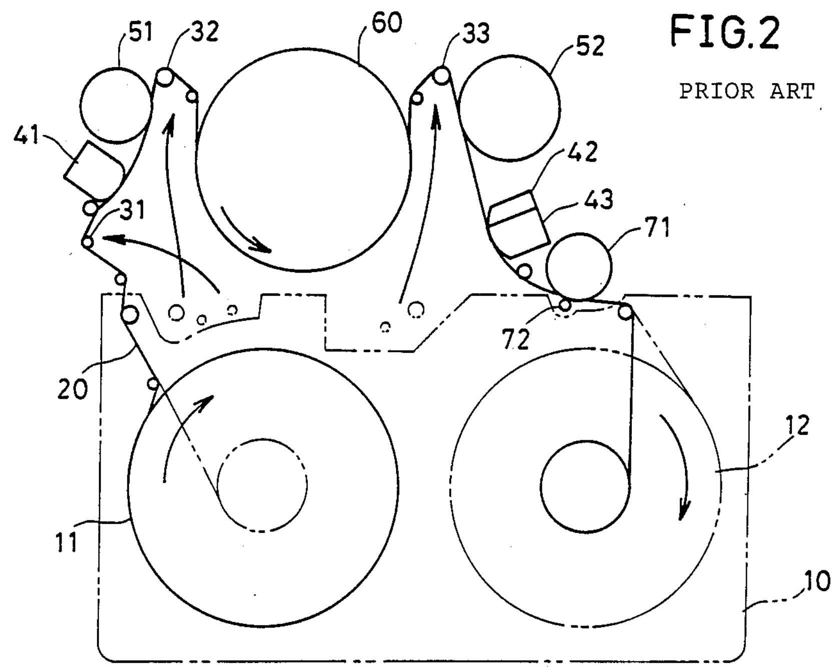
FIG. 2 is a plan view showing a loaded state of a magnetic tape in the VTR shown in FIG. 1.
Figure 3:
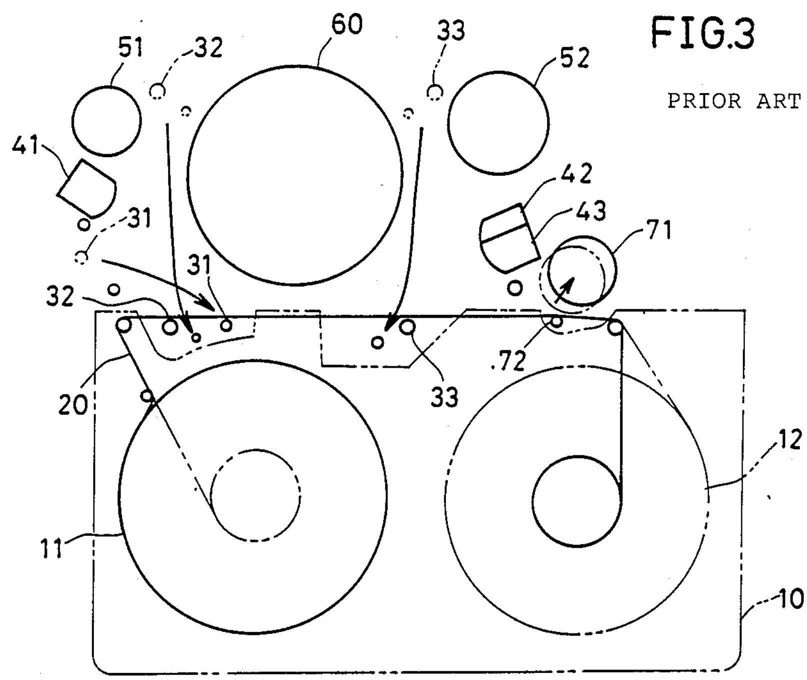
FIG. 3 is a plan view showing an unloaded state of the VTR shown in FIG. 1.
Figure 5:
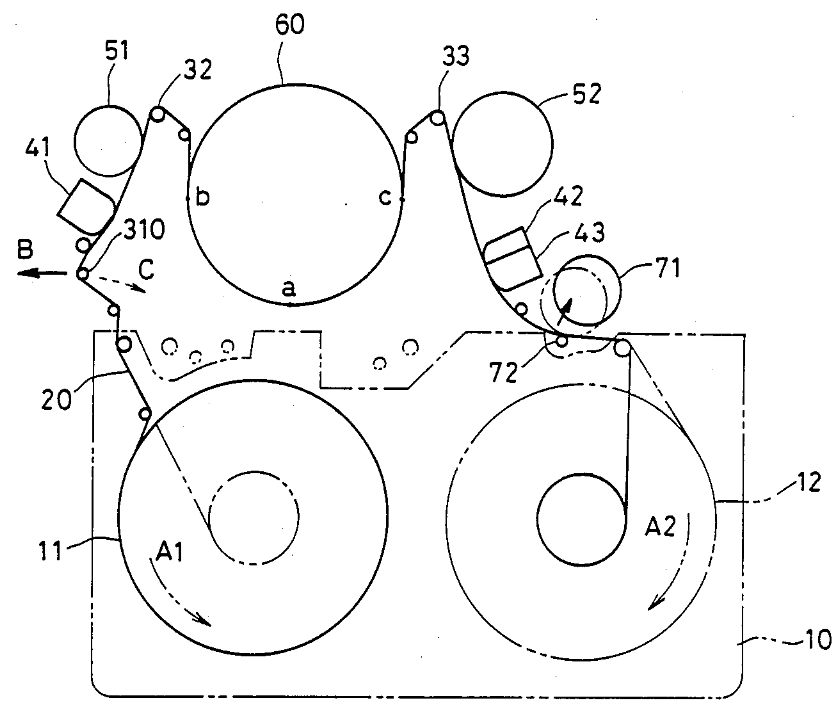
FIG. 5 is a plan view showing a tape running mechanism of a VTR in accordance with an embodiment of the present invention.

FIG. 5 is a plan view showing a running mechanism of a VTR in accordance with an embodiment of the present invention. The VTR in FIG. 5 is structured in the same manner as in the VTR shown in FIGS. 1 to 3 except for the below described points and therefore the corresponding portions are denoted by the same reference numerals and description thereof will be omitted.

In the embodiment shown in FIG. 5, a back tension arm 310 is provided instead of the guide roller 31 on the ingoing side of the conventional VTR. This back tension arm 310 possesses not only a function of guiding a magnetic tape as in the conventional ingoing guide roller 31 but also a function of controlling the back tension applied to the magnetic tape 20 with high precision. The positioning of the back tension arm 310 is finely adjusted by a control circuit 70 to be described below.

Figure 6:
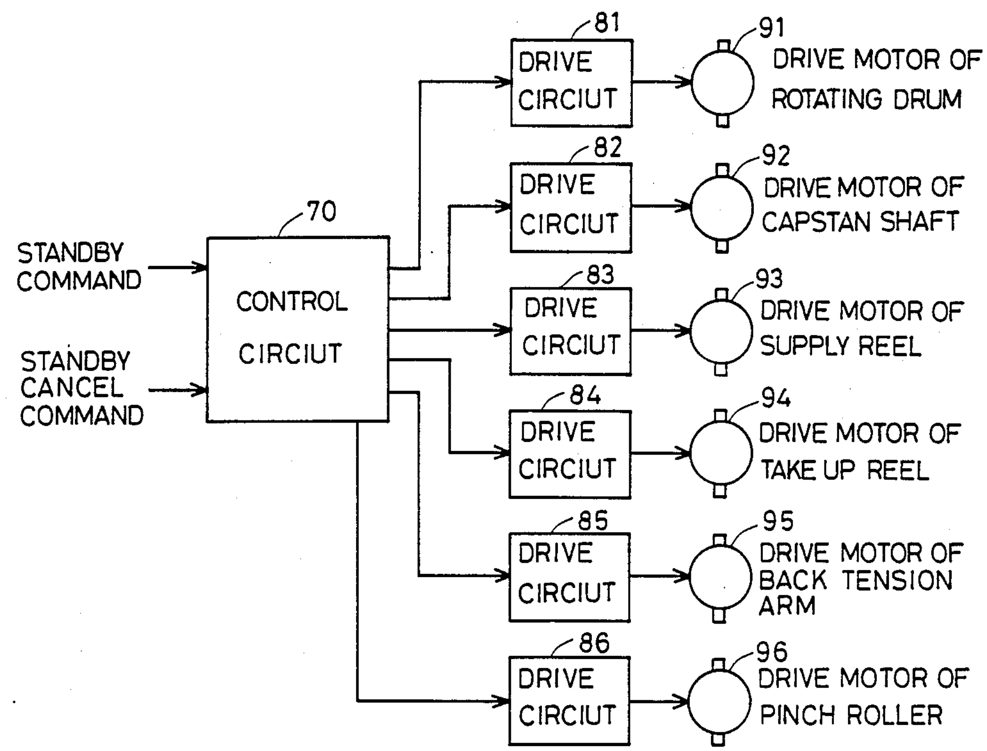
FIG. 6 is a schematic block diagram showing a part of an electrical circuit of a VTR in accordance with an embodiment of the present invention.

FIG. 6 is a block diagram showing an electrical circuit portion of the VTR shown in FIG. 5 in which only the portion of particular interest to the present invention is illustrated. Referring to FIG. 6, the control circuit 70 controls an operation sequence of the VTR of the invention and a 4-bit microcomputer of M50742 produced by Mitsubishi Denki Kabushiki Kaisha, for example, is used as the control circuit 70. The control circuit 70 receives a standby command for commanding a standby state and a standby cancel command for commanding the cancellation of a standby state. The standby command and the standby cancel command are issued in the long-period recording (intermittent recording) mode in association with occurrence of an event (for example, an entering of a human into a store). For example, if a human enters a store, a standby cancel command is generated to bring the VTR into a recording state. If a human goes out of the store, or if a predetermined period has passed after the issue of the standby cancel command, a standby command is issued to bring the VTR into a state waiting for recording (a standby state). Thus, the standby command and the standby cancel command are issued based on the output of a sensor for detecting an entering of a human into a store or a timer and the like operating in association therewith.

The output of the control circuit 70 is supplied to drive circuits 81 through 86. The outputs of the drive circuits 81 through 86 are supplied to motors 91 through 96, respectively. The motors 91, 92, 93 and 94 are motors for rotating a rotating drum 60, a capstan shaft 72, a supply reel 11 and a take-up reel 12, respectively. The motors 95 and 96 are motors for moving the back tension arm 310 and the pinch roller 71 toward predetermined directions, respectively.

When a standby command is received by the control circuit 70, the control circuit 70 stops the rotating drum 60 and the capstan shaft 72 and applies a back tension Ta of approximately 35 g.cm to the magnetic tape 20 by means of the back tension arm 310, the supply reel 11 and the take-up reel 12 so that the VTR is in a standby state. On the other hand, when a standby cancel command is received by the control circuit 70 as a result of occurrence of an event, the control circuit 70 controls the running mechanism in a manner in which the magnetic tape 20 is made to run by applying thereto a back tension Tb smaller than the above stated back tension Ta and then recording is made in the magnetic tape 20 in a normal recording mode.

FIG. 6 is a flow chart for explaining the operation of the control circuit 70 shown in FIG. 5. In the following, the operation of this embodiment will be described referring to FIG. 6.

Figure 7:
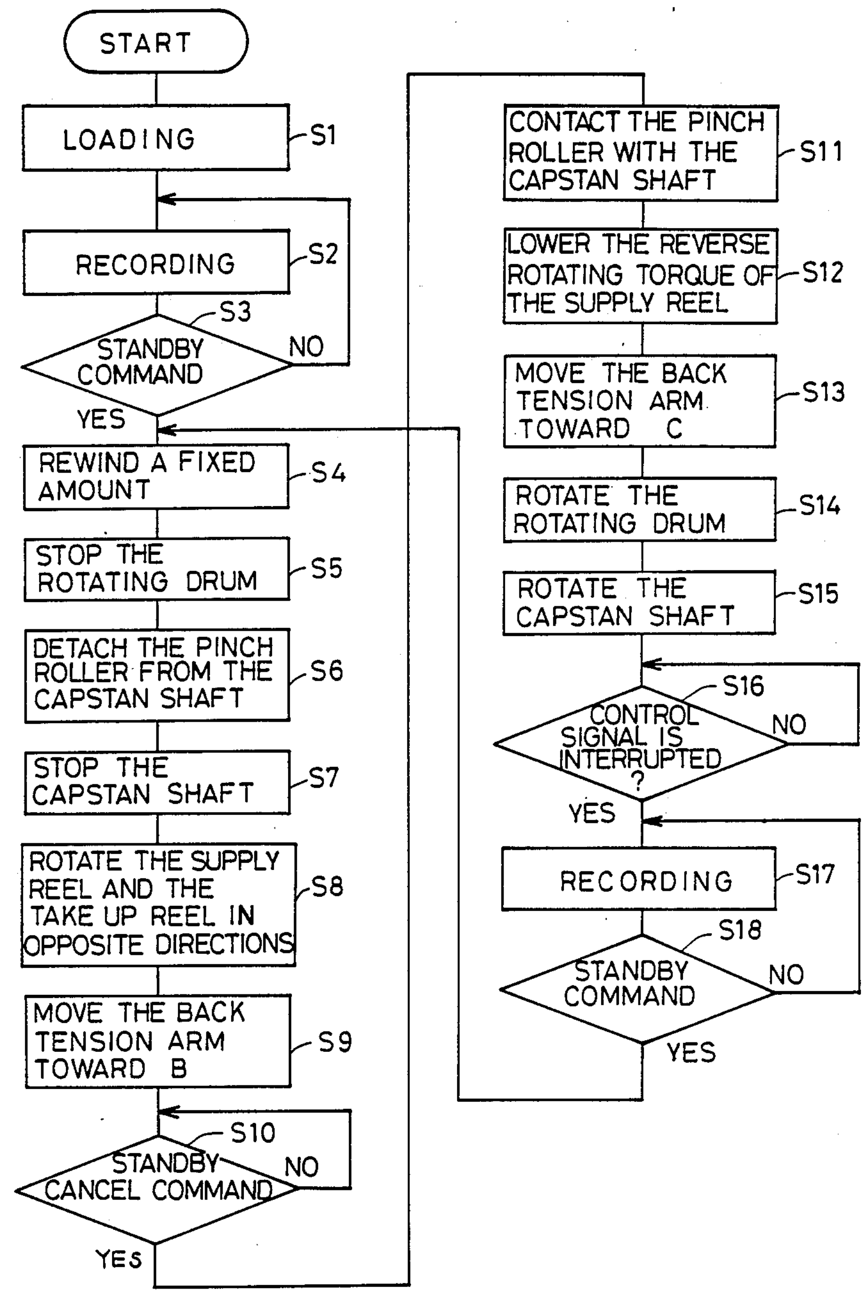
FIG. 7 is a flow chart for explaining the operation of the control circuit shown in FIG. 6.

When the VTR is brought into a long-period recording mode, the magnetic tape 20 is loaded as shown in FIG. 5 (in the step S1 in FIG. 7). Then, recording operation is performed for a prescribed period till a standby command is issued, for example, for a period when a human is in a store (in the steps S2 and S3). After the recording operation is completed, the rotation of the rotating drum motor 91 is stopped to bring the rotating drum 60 to a stop and the pinch roller moving motor 96 is driven to detach the pinch roller 71 from the capstan shaft 72, whereby the magnetic tape 20 is made to stop running (in the steps S5 and S6). Further, the capstan motor 92 is stopped so that the rotation of the capstan shaft 72 is stopped (in the step S7). Then, the supply reel motor 93 and the take-up reel motor 94 are driven to rotate the supply reel 11 and the take-up reel 12 as shown by the arrows A1 and A2 of chained lines in FIG. 5, respectively, and the back tension arm moving motor 95 is driven to move the back tension arm 310 at the maximum toward the direction B shown in FIG. 5, whereby a back tension is applied to the above stated magnetic tape 20 (in the steps S8 and S9). In this state, the VTR is maintained in the standby state till an event occurs next time, for example, till another human enters the store next time (in the step S10).

Figure 1:
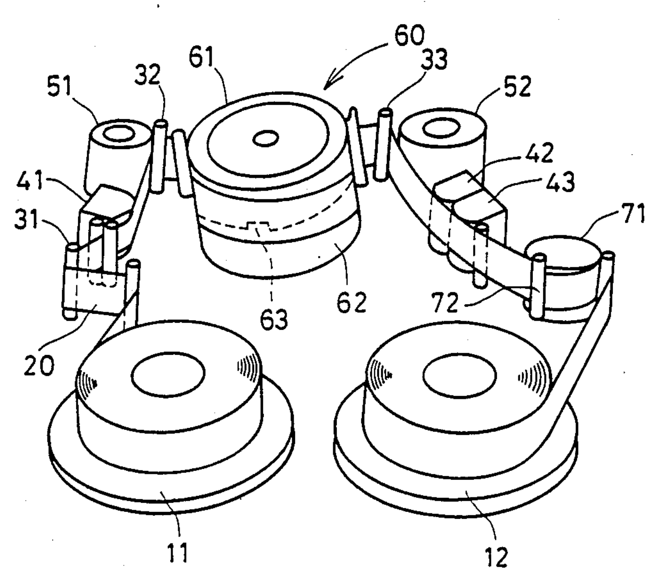
FIG. 1 is a perspective view showing a running mechanism of a conventional VTR of a helical scanning system.
Figure 4:
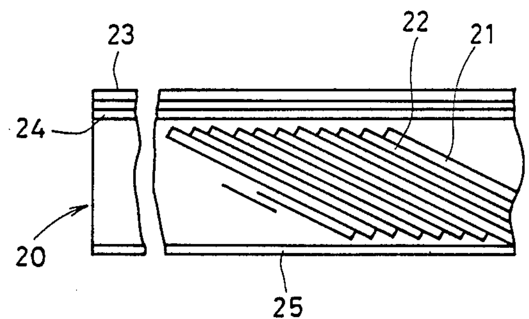
FIG. 4 is an illustration showing an example of a pattern of a magnetic tape recorded by a conventional VTR.

When the subsequent event occurs and a standby cancel command is issued, the pinch roller moving motor 96 is driven to bring the pinch roller 71 into contact with the capstan shaft 72 (in the step S11). Then, the rotating torque of the supply reel motor 93 is decreased to lower the reverse rotating torque of the supply reel 11 and the back tension arm moving motor 96 is driven to move the back tension arm 310 toward the direction C shown in FIG. 5 by a large amount, whereby the back tension applied to the magnetic tape 20 is decreased (in the steps S12 and S13). Subsequently, the rotating drum motor 91 is driven to rotate the rotating drum 60 by 1800 rpm for example (in the step S14). In such a manner, the state of the magnetic tape 20 and the rotating drum 60 is returned to the normal pause state and then, the capstan motor 92 is rotated so that the capstan shaft 72 and the pinch roller 71 are rotated to run the magnetic tape 20 (in the step S15). In consequence, recording is made in the normal recording mode (in the step S17). At this time, the back tension arm 310 is at the normal position, that is, at the position as shown in FIG. 1.

In the normal recording mode (in the steps S2 and S17), the tension applied to the magnetic tape 20 differs dependent on the points where the magnetic tape 20 runs. More specifically, the tension at the central point a of the rotating drum 60 is approximately 40 g, the tension at the point b is approximately 27 g and the tension at the point c is approximately 53 g. In this case, if the tension at the central point a of the rotating drum 60 becomes smaller than 40 g as a result of slackening of the running magnetic tape 20 for some cause or other, the back tension arm 310 moves toward the direction B shown by the solid line arrow in the figure. On the contrary, if the tension applied to the magnetic tape 20 is increased, the back tension arm 310 moves toward the direction C shown by the chained line arrow in the figure. Thus, in the normal recording mode, control is made so that the tension applied to the magnetic tape 20 is always approximately 40 g at the point a of the rotating drum 60. Also in a normal reproduction mode, control is made in the same manner. The above described control by moving the back tension arm 310 is made by the control circuit 70 based on the output of a position sensor (not shown) provided in the back tension arm 310. Otherwise, based on the output of the above stated position sensor, the reverse rotating torque of the supply reel 11 may be automatically adjusted.

After recording has been made for a prescribed period till the issue of a standby command, completely the same state as described above is established. More specifically, the rotating drum 60 is stopped and the capstan shaft 72 and the pinch roller 71 are brought out of contact so that the VTR is in a standby state till an event occurs next time (in the steps S18 and S4 to S10).

Thus, continuous recording operation is performed intermittently. However, it sometimes happens that a video signal is interrupted at the point of junction of the adjacent recorded signals or the video signal can not be synchronized. For the purpose of avoiding such phenomena, rewinding operation is made for a prescribed period before a standby state is established after the first recording (in the step S4) and at the time when the second recording is started, the trailing edge of the first control signal is detected so as to be joined with the second control signal (in the step S16). Such a joining system can be easily adopted in this embodiment.

In the above described embodiment of the present invention, the rotating drum 60 is stopped in a standby state and as a result straining or breakage of the video head and damage to the magnetic tape 20 can be avoided, which makes it possible to maintain long lifetime of the head and the tape 20. Accordingly, the standby state can be maintained for a long period. In addition, since a back tension is applied to the magnetic tape 20 if the rotating drum 60 is stopped, the magnetic tape 20 is positioned correctly on the slanted groove of the drum and therefore the tape 20 will never deviate.

Furthermore, since the standby state is established with the magnetic tape being maintained in a loaded state, the above described embodiment has good responsitivity, and wearing out of the loading mechanism thereof can be decreased as compared with a conventional system for establishing a standby position in an unloaded state. In addition, the format on the magnetic tape recorded by the above described embodiment is exactly the same as the format continuously recorded by a conventional VTR and therefore interchangeability is maintained.

Although in the foregoing embodiment an apparatus having recording and reproducing functions was described, a VTR in accordance with the present invention may only have at least a function of intermittent recording.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic tape recording apparatus having at least a function of recording continuously or intermittently a signal in a magnetic tape, comprising:

a rotating drum to which a magnetic head is attached, a loading mechanism for setting said magnetic tape onto said rotating drum, a capstan shaft for running said magnetic tape, a back tension arm for applying a back tension to said magnetic tape, and control means responsive to a standby command for stopping the rotation of said rotating drum and said capstan shaft without cancelling the loaded state of said magnetic tape set by said loading mechanism and for applying a prescribed back tension to said magnetic tape by using said back tension arm.

2. A magnetic tape recording apparatus in accordance with claim 1, wherein said back tension arm serves also as a guide arm in said loading mechanism.

3. A magnetic tape recording apparatus having at least a function of recording continuously or intermittently a signal in a magnetic tape, comprising:

a rotating drum to which a magnetic head is attached, a loading mechanism for setting said magnetic tape onto said rotating drum, a supply reel onto which one end of said magnetic tape is wound, a take-up reel onto which the other end of said magnetic tape is wound, a capstan shaft for moving said magnetic tape from said supply reel to said take-up reel, and control means responsive to a standby command for stopping the rotation of said rotating drum and said capstan shaft without cancelling the loaded state of said magnetic tape set by said loading mechanism and for applying a prescribed back tension to said magnetic tape by applying opposite rotating torques to said supply reel and said take-up reel.

4. A magnetic tape recording apparatus having at least a function of recording continuously or intermittently a signal in a magnetic tape, comprising:

a rotating drum to which a magnetic head is attached, a loading mechanism for setting said magnetic tape onto said rotating drum, a supply reel onto which one end of said magnetic tape is wound, a take-up reel onto which the other end of said magnetic tape is wound, a capstan shaft for moving said magnetic tape from said supply reel to said take-up reel, a back tension arm for applying a back tension to said magnetic tape, and control means responsive to a standby command for stopping the rotation of said rotating drum and said capstan shaft without cancelling the loaded state of said magnetic tape set by said loading mechanism and for applying a prescribed back tension to said magnetic tape by applying opposite rotating torques to said supply reel and said take-up reel as well as by using said back tension arm.

5. A magnetic tape recording apparatus in accordance with claim 4, wherein said back tension arm serves also as a guide arm in said loading mechanism.

* * * * *

UNITED STATES PATENT AND TRADEMARK OFFICE

CERTIFICATE OF CORRECTION

PATENT NO. : 4,700,255

DATED : October 13, 1987

INVENTOR(S) : Yasuo MITSUHASHI

It is certified that error appears in the above-identified patent and that said Letters Patent is hereby corrected as shown below:

In Figure 6, change "CIRCIUT" to "CIRCUIT" (seven instances)

Signed and Sealed this

Eighth Day of August, 1989

*Attest:*

DONALD J. QUIGG

*Attesting Officer*

*Commissioner of Patents and Trademarks*